United States Patent
Fregly et al.

(10) Patent No.: US 12,118,302 B2
(45) Date of Patent: Oct. 15, 2024

(54) REGULAR EXPRESSION SEARCHING

(71) Applicant: VERISIGN, INC., Reston, VA (US)

(72) Inventors: Andrew Fregly, Reston, VA (US);
Zhao Zhao, Fairfax, VA (US);
Swapneel Sheth, Fairfax, VA (US);
Scott Hollenbeck, Fairfax Station, VA (US)

(73) Assignee: VeriSign, Inc., Reston, VA (US)

( * ) Notice: Subject to any disclaimer, the term of this patent is extended or adjusted under 35 U.S.C. 154(b) by 0 days.

(21) Appl. No.: 15/782,264

(22) Filed: Oct. 12, 2017

(65) Prior Publication Data

US 2018/0121410 A1   May 3, 2018

Related U.S. Application Data

(60) Provisional application No. 62/414,227, filed on Oct. 28, 2016.

(51) Int. Cl.
| | | |
|---|---|---|
| *G06F 16/80* | (2019.01) | |
| *G06F 16/242* | (2019.01) | |
| *G06F 16/83* | (2019.01) | |
| *G06F 16/838* | (2019.01) | |
| *G06F 40/211* | (2020.01) | |

(Continued)

(52) U.S. Cl.
CPC .......... *G06F 40/211* (2020.01); *G06F 16/242* (2019.01); *G06F 16/83* (2019.01); *G06F 16/838* (2019.01); *H04L 61/4511* (2022.05); *H04L 67/02* (2013.01)

(58) Field of Classification Search
CPC ............. G06F 16/3331; H04L 61/1511; H04L 61/4511

See application file for complete search history.

(56) References Cited

U.S. PATENT DOCUMENTS

| | | | |
|---|---|---|---|
| 6,601,061 B1 * | 7/2003 | Holt | ............... G06F 16/951 |
| 8,676,667 B1 * | 3/2014 | Paiz | ............... G06F 16/951 |
| | | | 705/26.63 |

(Continued)

OTHER PUBLICATIONS

Russ Cox, "Regular Expression Matching with a Trigram Index or How Google Code Search Worked", Jan. 2012. Retrieved from the Internet Jan. 11, 2018: https://swtch.com/~rsc/regexp/regexp4.html, pp. 1-7.

(Continued)

*Primary Examiner* — Mohammad S Rostami
(74) *Attorney, Agent, or Firm* — McCarter & English LLP; Michael A. Sartori

(57) ABSTRACT

Methods, systems, and computer program products are provided for optimizing searches of records including text elements. The methods, systems, and computer program perform operations including receiving a regular expression search query from a client. The operations also include parsing elements of the regular expression search query. The operations further include identifying search mechanisms based on the elements parsed from the search query. In addition, the operations include searching a data set identified by the regular expression search query using the search mechanisms. Further, the operations include returning a search result from the data set to the client based on a result of the searching.

19 Claims, 5 Drawing Sheets

(51) Int. Cl.
*H04L 61/4511* (2022.01)
*H04L 67/02* (2022.01)

(56) References Cited

U.S. PATENT DOCUMENTS

| | | | |
|---|---|---|---|
| 2004/0019477 A1* | 1/2004 | Finkelstein | G06F 16/313 |
| | | | 704/3 |
| 2005/0060291 A1* | 3/2005 | Kirkland | G06F 16/951 |
| | | | 707/999.005 |
| 2007/0055664 A1 | 3/2007 | Michaeli et al. | |
| 2008/0071765 A1* | 3/2008 | Ichiriu | G06F 16/90344 |
| 2008/0071781 A1* | 3/2008 | Ninan | G06F 16/90344 |
| 2009/0157675 A1* | 6/2009 | Stellhorn | G06Q 10/107 |
| 2009/0287680 A1* | 11/2009 | Paek | G06F 16/3322 |
| 2011/0066632 A1* | 3/2011 | Robson | G16C 20/40 |
| | | | 707/769 |
| 2013/0117308 A1* | 5/2013 | Korhonen | H04L 29/12113 |
| | | | 707/770 |
| 2014/0059078 A1* | 2/2014 | Gulwani | G06F 16/3331 |
| | | | 707/E17.014 |
| 2015/0161266 A1* | 6/2015 | Conradt | G06F 16/9535 |
| | | | 707/706 |
| 2016/0253378 A1* | 9/2016 | Marom | G06F 16/245 |
| | | | 707/755 |
| 2017/0195286 A1* | 7/2017 | Stahura | H04L 61/1511 |
| 2017/0331784 A1* | 11/2017 | Tang | H04L 61/1511 |

OTHER PUBLICATIONS

Extended European Search Report dated Jan. 25, 2018, European Application No. 17198968.4, pp. 1-8.

\* cited by examiner

REGULAR EXPRESSION SEARCHING

RELATED APPLICATION

The present application claims the benefit of, and priority to, U.S. Provisional Patent Application No. 62/414,227, entitled, "REGULAR EXPRESSION SEARCHING" filed Oct. 28, 2016, the entirety of which is hereby incorporated by reference.

BACKGROUND

The Domain Name System (DNS) is the part of the Internet infrastructure that translates human-readable domain names into Internet Protocol (IP) numbers needed to establish communications over the Internet. That is, DNS allows users to refer to web sites, and other resources, using memorable domain names, such as "www.en.example.com," rather than the numeric IP addresses, such as "123.4.56.78," which are machine readable addresses used by software to communicate with computers on the Internet.

Each domain name is made up of a series of character strings (labels) separated by dots. The right-most label in a domain name is known as the "top-level domain" (TLD). Examples of well-known TLDs are ".com," ".net," ".org." etc. Each TLD supports second-level domains, listed immediately to the left of the TLD, e.g., "example" in "www.example.com." Each second-level domain can support a number of third-level domains located immediately to the left of the second-level domain, e.g., "en" in "www.en.example.com." There can be additional level domains as well. For example, a domain with additional domain levels could be "www.landscape.photos.example.com."

Registries are entities that manage the domain names of the TLDs. For example, VERISIGN, INC. is a registry that manages the .COM and .NET TLDs. To administer a domain name in accordance with current provisions of the Internet Corporation for Assigned Names and Numbers (ICANN), registries maintain a certain minimum amount of information associated with the domain names in a TLD managed by the registry to ensure proper identification, security features, and operability associated with the domain names. For example, in order for a domain name to function correctly, the registry has nameserver information for the domain name to load into the registry's TLD DNS system to refer outside DNS requests to the proper authoritative DNS servers. Other information could include an identifier of a registrar through which the domain name's registration took place, the registration date, the expiration date, and the status of the domain name.

A registry administers a TLD by responding to search queries for the domain name information they manage. For example, registries provide services, such as WHOIS and Registration Data Access Protocol (RDAP), which respond to queries for domain registration information (e.g., registration date, expiration date, status, and owner of the registered domain names). However, searching such large data sets can be costly and inefficient in terms of time and computing resources. For example, in response to a search query, a WHOIS server may search an entire corpus of records in a registry, of which the relevant information may be merely be a small subset. Such methods incur a large computing performance overhead by inefficiently processing information that is not relevant to the particular search query. The inefficiencies are even greater when searching large data sets in which the data is sequentially scanned.

SUMMARY

Methods, systems, and computer program products disclosed herein perform operations including receiving a regular expression search query from a client. The operations also include parsing elements of the regular expression search query. The operations further include identifying search mechanisms based on the elements parsed from the search query. In addition, the operations include searching a data set identified by the regular expression search query using the search mechanisms. Further, the operations include returning a search result from the data set to the client based on a result of the searching.

In addition, methods, systems, and computer program products disclosed herein perform operations including generating data structures corresponding to strings of text included in structured documents stored in a data set. The operations also include identifying search mechanisms based on the elements parsed from a search query. The operations further include searching the data structures using the search mechanisms. Additionally, the operations include returning a search result from the data set based on a result of the searching.

DRAWINGS

The present invention will become more fully understood from the detailed description and the accompanying drawings, wherein.

DETAILED DESCRIPTION

Figure 1:
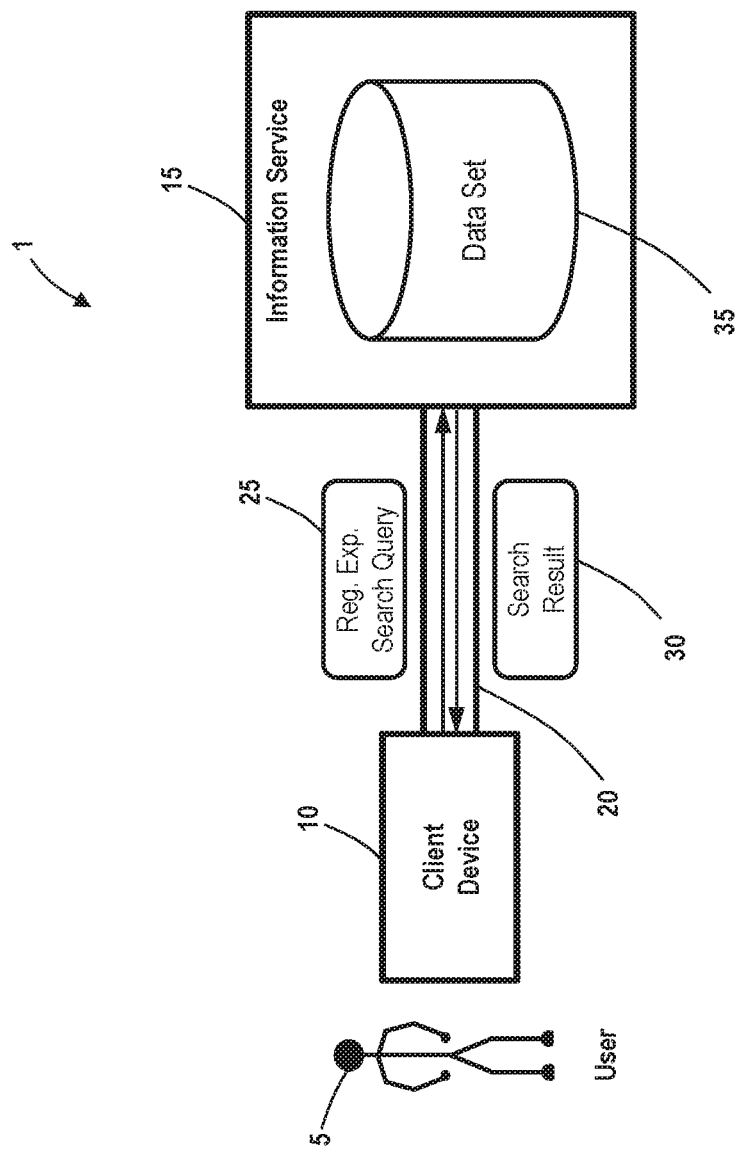
FIG. 1 shows a system block diagram illustrating an example of an environment for implementing systems and processes in accordance with aspects of the present disclosure.

The present disclosure is directed to searching for information stored in computing systems and, more specifically, to optimizing searches of records including text elements. Systems, methods, and computer-readable storage devices in accordance with aspects of the present disclosure can improve performance of computing systems performing such search by carrying out the searches against lists containing solely elements of the text that are relevant to a regular expression search query. A regular expression search query is a series of text (e.g., letters and other characters) that defines a search for a corpus of information. It uses a standard textual syntax that represents patterns which text satisfying the search query must conform to. The syntax can include regular characters (e.g., a, b, c, etc.) and metacharacters (e.g., operators and wildcards). For example, a regular expression search query for "seriali[sz]e" includes the operator "[ ]" for specifying a match of any single character in the group "sz." Accordingly, the search query would match both words "serialise" and "serialize" included in the corpus of information.

The systems, methods, and computer-readable storage devices disclosed herein can also optimize searching of the lists containing solely elements of the text that are relevant to a regular expression search query by reducing the lists to subsets by applying a sequence of optimized trimming techniques that are identified based on an analysis of the search query. Doing so increases the speed at which computing systems can determine results during a search and reduces utilization of computing resources involved in performing the search.

Implementations of the systems, methods, and computer-readable storage devices disclosed herein can be applied in situations where an index or hash table would be sequentially searched, rather than searched using the technique that the index or hash table was originally meant to support (e.g., binary tree search or hash search). This situation can occur where the search query contains elements that prevent it from using the original technique for which the index or hash table was intended. For example, regular expressions often contain elements that prevent use of a binary search against an index or use of a hashing method to search against a hash table. In these cases, the search will typically then be performed by sequentially scanning the data elements.

Implementations of systems, methods, and computer-readable storage devices disclosed herein can also be applied in situations where selected text elements pertinent to a collection of structured text documents are to be searched. Optimized methods are disclosed for preprocessing the documents in a collection to produce lists of the text elements to which optimized search mechanisms defined herein can be applied.

Additionally, implementations of the systems, methods, and computer-readable storage devices disclosed herein can be applied to domain name registries to optimize RDAP searching using regular expressions. More specifically, implementations disclosed herein provide RDAP query extensions that add path segments that allow searching using extended regular expressions (e.g., POSIX (Portable Operating System Interface) regular expressions). Accordingly, such implementations can optimize searches that use regular expressions to search databases of DNS registries containing DNS registration data and can also optimize searching of structured text representations of the DNS registration data.

Moreover, implementations of the systems, methods, and computer-readable storage devices disclosed herein are also generally applicable to searching data sets including structured text documents (e.g., JSON (JavaScript Object Notation), XML (EXtensible Markup Language), SGML (Standard Generalized Markup Language), HTML (Hyper Text Markup Language), etc.) in situations, for example, where the existing search mechanisms cannot always take advantage of data structures commonly used for search optimization. Examples of search mechanisms that cannot always take advantage of data structures commonly used for search optimization include SQL search terms and regular expression search terms that have a leading wild card and a trailing wild card. Examples of data structures commonly used for search optimization include binary tree indexes and hash tables.

Reference will now be made in detail to specific implementations illustrated in the accompanying drawings and figures. In the following detailed description, numerous specific details are set forth in order to provide a thorough understanding of the invention. However, it will be apparent to one of ordinary skill in the art that implementations may be practiced without these specific details. In other instances, well-known methods, procedures, components, circuits, and networks have not been described in detail so as not to unnecessarily obscure aspects of the implementations.

FIG. 1 shows a block diagram illustrating an example of an environment 1 for implementing systems and processes in accordance with aspects of the present disclosure. Environment 1 can include a user 5, a client device 10, an information service 15, and a communication channel 20. The user 5 can be any entity that generates a regular expression search query 25 to request a search result 30 from the information service 15. For example, the user 5 can be an individual, a business, or a computing device that generates and/or provides the regular expression search query 25. The client device 10 can be a computing system that is communicatively connected to the information service 15 via the communication channel 20. For example, the client device can be a personal computer system, a server computer system, a handheld or laptop device, a set top box, or other programmable user electronics. The information service 15 can be a computer system/server including one or more general purpose or special purpose computing systems. For example, the information service 15 can be, but is not limited to, a personal computer system, a server computer system, a minicomputer system, a mainframe computer system, a distributed computing system, and combinations thereof. In some implementations, the information service 15 is one or more servers that provide a WHOIS or RDAP service. The communication channel 20 can be a direct or indirect communication channel, such as a local area network (LAN), a general wide area network (WAN), and/or a public network (e.g., the Internet).

In an illustrative implementation consistent with the present disclosure, the information service 15 is an RDAP server system including a data set 35 and the regular expression search query 25 having a regular expression format (e.g., "ns[1-9]\.e[a-z]ample\.com"). The user 5 can generate the regular expression search query 25 using the client device 10 (e.g., using a text editor application) and provide the regular expression search query 25 to the information service 15 via the communication channel 20. The client device 10 can encode the regular expression search query 25 for transmission. For example, the search query "ns[1-9]\.e[a-z]ample\.com" can be base64url encoded to "bnNbMS05XVwuZVthLX-pdYWlwbGVcLmNvbQ." The client device 10 provides the encoded search query 25 as an RDAP HTTPS (Hypertext Transfer Protocol Secure) request, in which the request includes additional information specifying a regular expression search. For example, the RDAP search query can be: https://example.com/rdap/domains?nsLdhName=bnNbMS05XVwuZVthLXpdYW1wbGVcLmNvbQ&searchtype=regex, which identifies the request ("rdap"), which includes the arguments of the search query (e.g., domains?nsLdhName=bnNbMS05XVwuZVthLXpdYW1wbGVcL-mNvbQ"), and specifies a regular expression search (e.g., "searchtype-regex"). The information service 15 can receive the regular expression search query 25 from the communication channel 20 and decode the base64url encoded regular expression back to "ns[1-9]\.e[a-z]ample\.com." In accordance with implementations of the present disclosure, the information service 15 can parse the regular expression search query 25 to determine its components, including any non-wild-carded prefix, non-wild-carded suffix, and any "must have" (i.e., required) characters (i.e., non-optional and/or non-wildcard characters). For example, the information service 15 can determine that the regular expression "ns[1-9]\.e[a-z]ample\.com" has the following components: a non-wildcarded prefix of "ns," a non-wildcarded suffix of "ample.com," and must-have characters a, c, e, l, m, n, o, p, and s. In accordance with aspects of the present disclosure, the information service 15 uses the information parsed from the regular expression search query 25 to determine one or more search mechanisms for optimizing searching of the data set 35, as well as a pipelined order for performing such search mechanisms. For example, the information service 15 can determine that search mechanisms corresponding to the search using the regular expression search query 25 should include the following search mechanisms: (1) a joined index search using the prefix "ns" to search element prefixes and "moc.elpma" to search reversed character order element suffixes; (2) a bitmap filter search using the characters a, c, e, l, m, n, o, p, s as a mask to be matched against bitmaps of characters found in searchable elements; and (3) a regular expression search using the received regular expression. The information system 15 can serially or in parallel perform each of the search mechanisms according to the pipelined order, wherein the results of each search mechanism are provided as an input to the next search mechanism in the pipeline. For example, the information service 15 can determine to perform the joined index search, the bitmap filter search, and the regular expression search as the order of the pipeline, wherein the results from each of the individual searches are fed into the immediately subsequent search mechanism in the pipeline. By doing so, the scope for each successive search mechanism can be decreased, which contributes to a reduction in the computational overhead involved in responding to the regular expression search query. The information service 15 can use the matching elements from the final search mechanism (e.g., the regular expression search) in the pipeline to retrieve the full set of RDAP data corresponding to each matched element from the data set 35 and generate the search result 30, which can be sent back to the client device 10 via the communication channel 20.

While the above example describes using base64url encoding to encode the regular expression, in other embodiments, different types of encodings can be used, such as, for example percent encoding.

Figure 2:
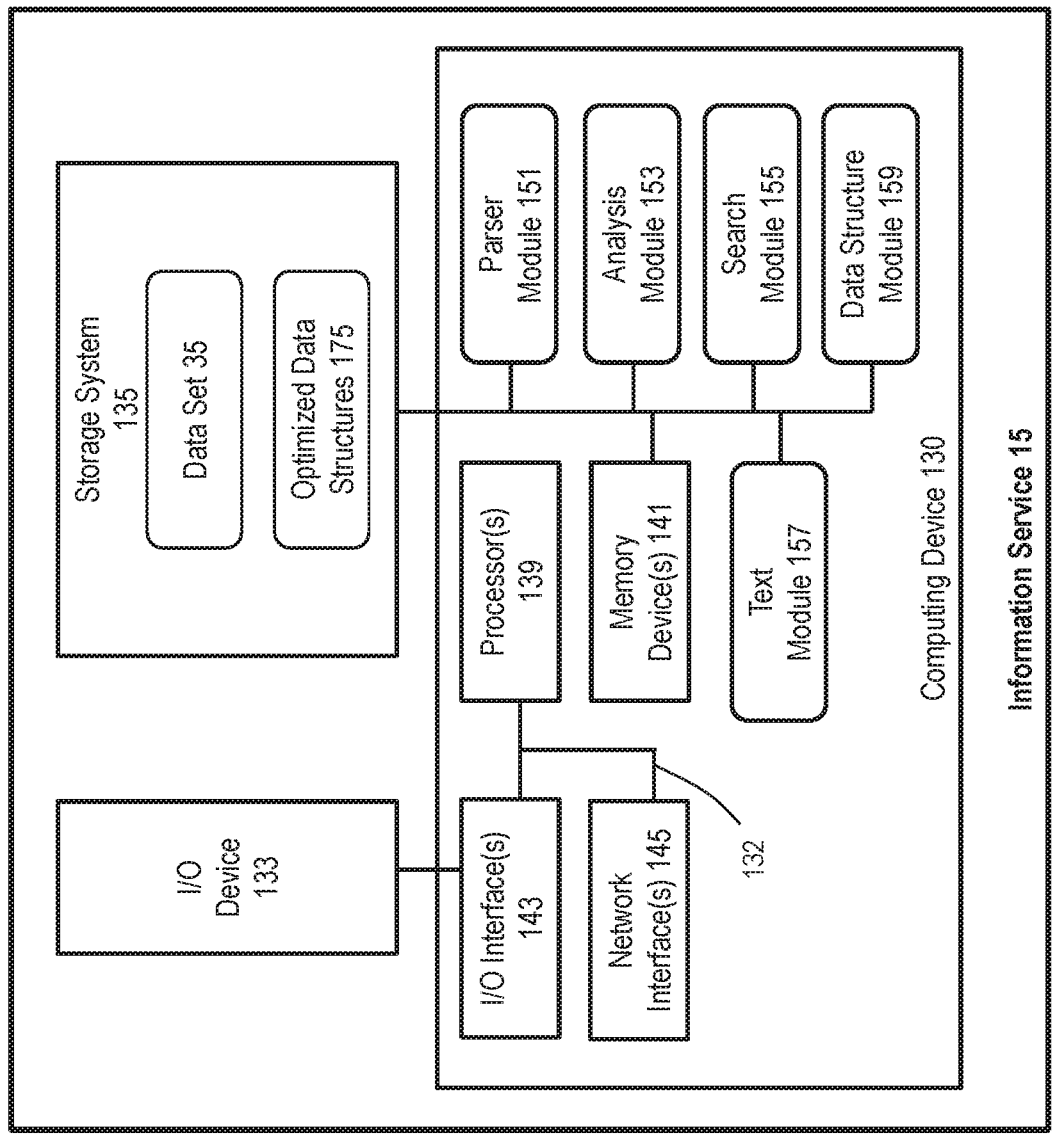
FIG. 2 shows a system block diagram illustrating an example of an information service in accordance with aspects of the present disclosure.

FIG. 2 shows a system block diagram illustrating an example of an information service 15 in accordance with aspects of the present disclosure. The information service 15 can be the same or similar to that described above. The information service 15 includes hardware and software that perform the processes and functions disclosed herein. In particular, the information service 15 includes a computing device 130, an input/output (I/O) device 133, and a storage system 135. The I/O device 133 can include any device that enables an individual to interact with the computing device 130 (e.g., a user interface) and/or any device that enables the computing device 130 to communicate with one or more other computing devices using any type of communications link. The I/O device 133 can be, for example, a touchscreen display, pointer device, keyboard, etc.

The storage system 135 can include a computer-readable, non-volatile hardware storage device that stores information and program instructions. For example, the storage system 135 can be one or more flash drives and/or hard disk drives. In accordance with aspects of the present disclosure, the storage device 135 stores a data set 35 including records having text elements. For example, the data set 35 can be a domain name registry storing domain name records in a JSON format. Additionally, in accordance with aspects of the present disclosure, the storage system 135 can store optimized data structures 175 generated by the information service 15 from the data set 35. The optimized data structures 175 can be indices of text elements included in records stored in the data set 35. The optimized data structures might also be bit maps that indicate the letters found in text elements. For example, the optimized data structures 175 can include indexes suitable for searching prefixes and suffixes of text elements of a particular element type and bit maps for the letters found in each element of the particular element type.

In embodiments, the computing device 130 includes one or more processors 139 (e.g., microprocessor, microchip, or application-specific integrated circuit), one or more memory devices 141 (e.g., RAM and ROM), one or more I/O interfaces 143, and one or more network interfaces 145. The memory device 141 can include a local memory (e.g., a random access memory and a cache memory) employed during execution of program instructions. Additionally, the computing device 130 includes at least one communication channel 132 (e.g., a data bus) by which it communicates with the I/O device 133 and the storage system 135. The processor 139 executes computer program instructions (e.g., an operating system and/or application programs), which can be stored in the memory device 141 and/or the storage system 135.

Moreover, the processor 139 can execute computer program instructions of a parser module 151, an analysis module 153, a search module 155, a text module 157, and a data structure module 159. In accordance with aspects of the present disclosure, the parser module 151 parses queries (e.g., the search query 25) received by the information service 15. The analysis module 153 functions to determine search mechanisms for searching a database (e.g., the data set 35) and an order for performing such search mechanisms. The search module 155 functions to search one or more optimized data structures within the RDAP data set using search mechanisms determined by the analysis module 153 and to generate a search result (e.g., the search result 30). The text module 157 analyzes text of records stored in the database (e.g., the data set 35) to identify elements contained there that can be used to generate the optimized data structures 175. The data structure module 159 generates the optimized data structures 175 based on text elements identified by the text module 157. The optimized data structures 175 may be loaded into the memory device 141 to minimize access time during search processing by the search module 155.

It is noted that the computing device 130 can include any general purpose computing article of manufacture capable of executing computer program instructions installed thereon (e.g., a personal computer, server, etc.). However, the computing device 130 is only representative of various possible equivalent computing devices that can perform the processes described herein. To this extent, in embodiments, the functionality provided by the computing device 130 can be any combination of general and/or specific purpose hardware and/or computer program instructions. In each embodiment, the program instructions and hardware can be created using standard programming and engineering techniques, respectively.

Figure 3:
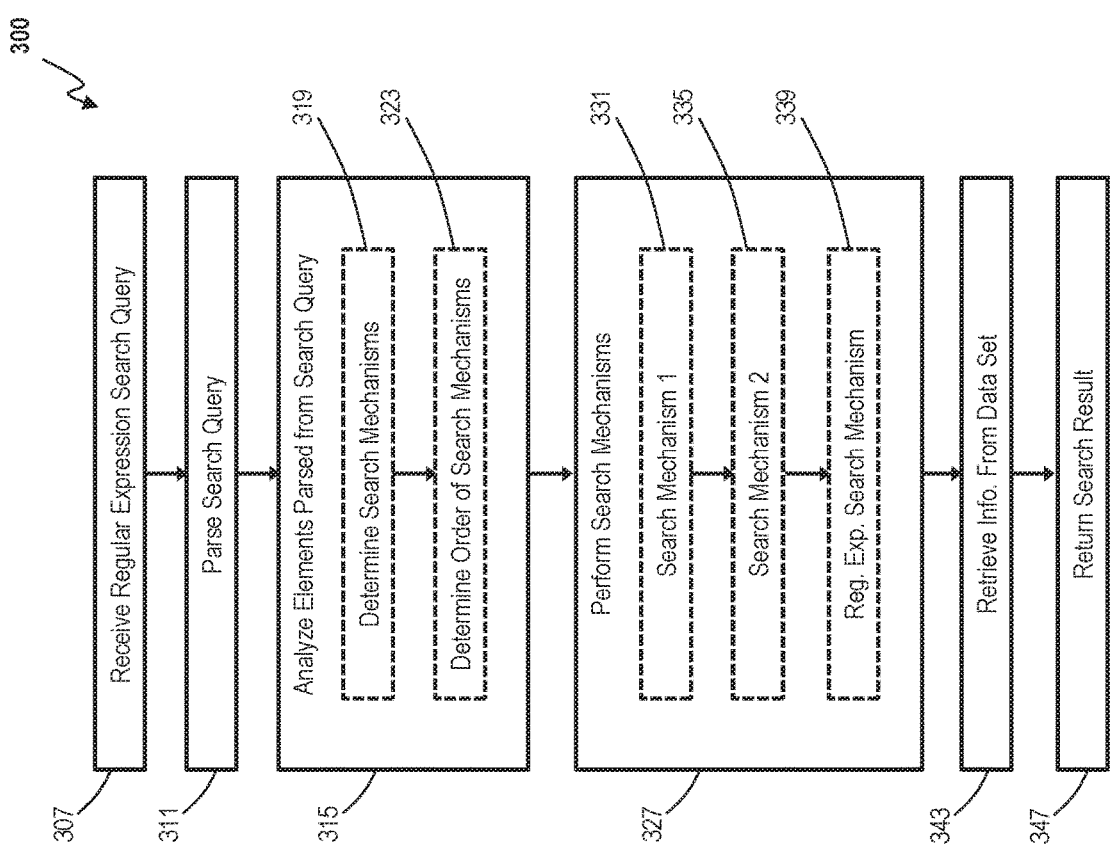
FIG. 3 shows a flow block diagram illustrating an example of a process in accordance with aspects of the present disclosure.
Figure 4:
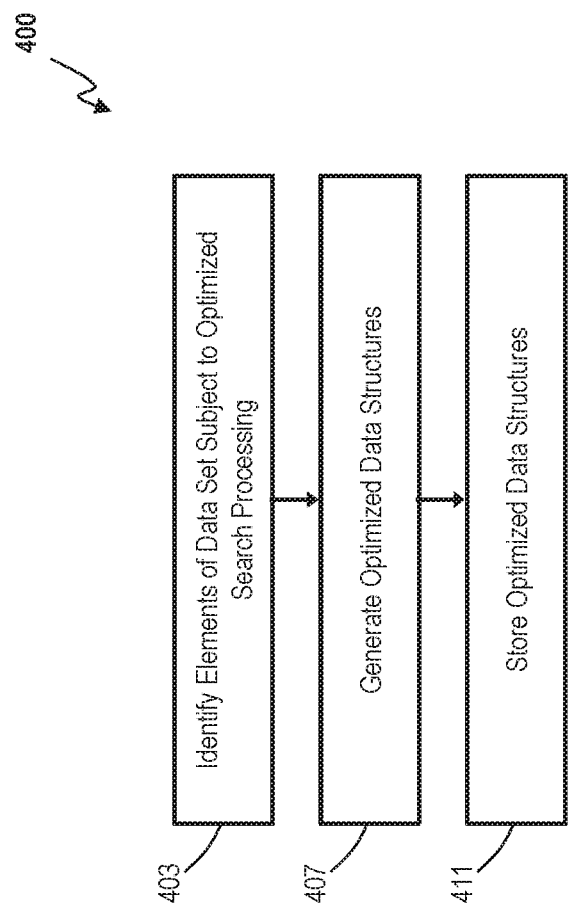
FIG. 4 shows a flow block diagram illustrating an example of a process in accordance with aspects of the present disclosure.
Figure 5:
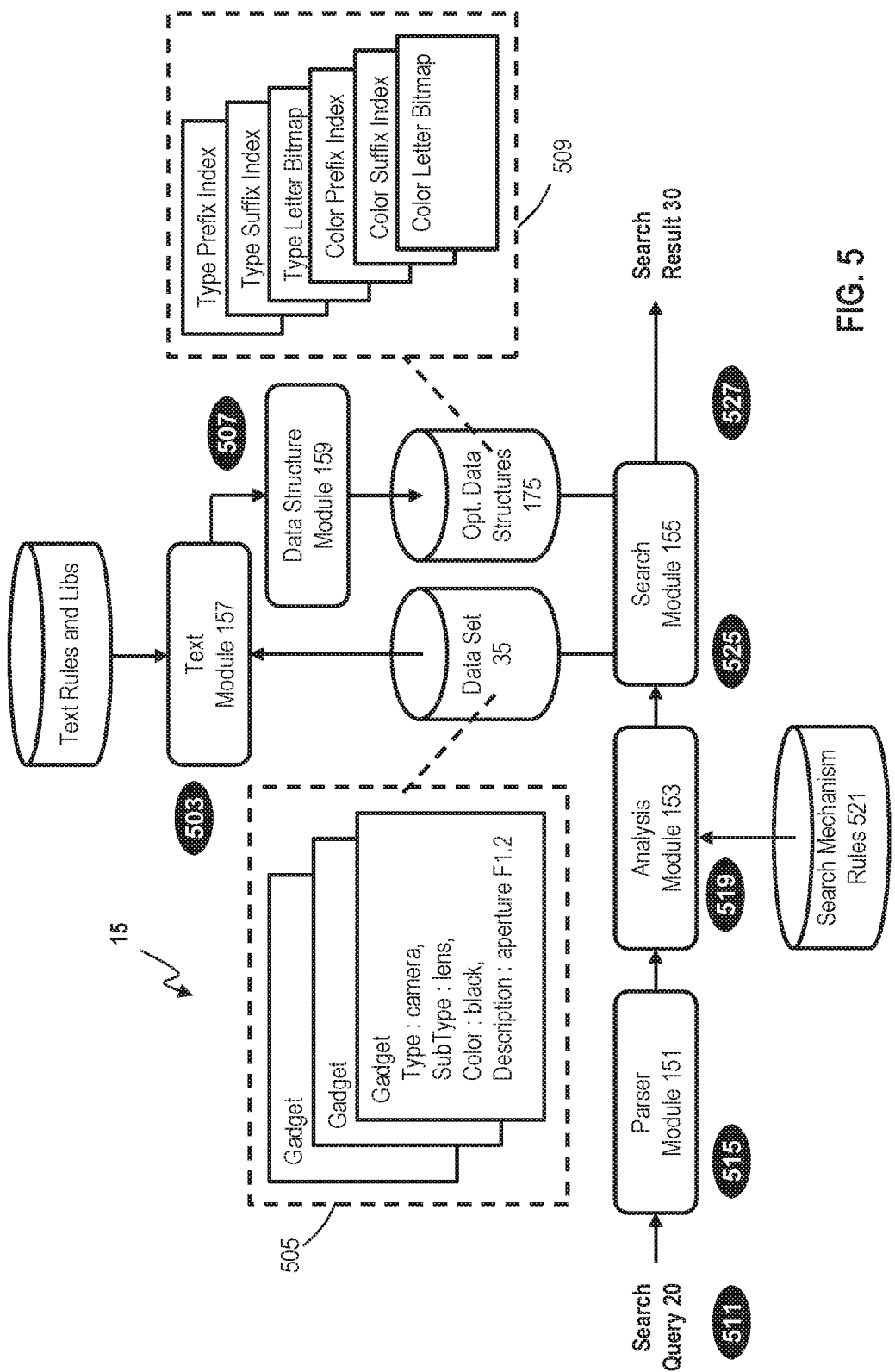
FIG. 5 shows a functional block diagram illustrating an example of a process in accordance with aspects of the present disclosure.

The flow diagrams in FIGS. 3-5 illustrate examples of the functionality and operation of possible implementations of systems, methods, and computer program products according to various implementations consistent with the present disclosure. Each block in the flow diagrams of FIGS. 3-5 can represent a module, segment, or portion of program instructions, which includes one or more computer executable instructions for implementing the illustrated functions and operations. In some implementations, the functions and/or operations illustrated in a particular block of the flow diagram can occur out of the order shown in FIGS. 3-5. For example, two blocks shown in succession can be executed substantially concurrently, or the blocks can sometimes be executed in the reverse order, depending upon the functionality involved. It will also be noted that each block of the flow diagram and combinations of blocks in the block can be implemented by special purpose hardware-based systems that perform the specified functions or acts, or combinations of special purpose hardware and computer instructions.

FIG. 3 shows a flow block diagram illustrating an example of a process 300 for optimized regular expression searching performed by an information service (e.g., the information service 15) in accordance with aspects of the present disclosure. At 307 the information service receives a regular expression search query (e.g., the regular expression search query 25) from a user (e.g., the user 5 using the client device 10) for searching a set of data (e.g., the data set 35) storing records including text elements (e.g., documents, webpages, catalogs, and the like). In some implementations, the records include structured text documents (e.g., XML, JSON, SGML, RTF, HTML, etc.). In other implementation, the records may include discrete elements stored in a database or other set of data. At 311 the information service (e.g., the executing parser module 151) parses the search query received at 307 and extracts elements of the regular expression search query (e.g., prefix, suffix, words, individual characters) and removes any wild cards elements (e.g., "*," "?," "!," "[1-9]," and "[a-z]") that may be included in the regular expression search query.

At 315 the information service (e.g., executing the analysis module 153) analyzes the elements of the regular expression extracted from the search query at 311 to identify particular elements that can be used to reduce the number of records in the database (e.g., the data set 35) to be searched. For instance, the analysis may identify a non-wild-carded prefix in the regular expression, or may identify a non-wild-carded suffix in the regular expression. In some implementations, the analyzing can include, at 319, determining one or more search mechanisms to perform based on the elements. For example, it might be determined that an identified non-wild-carded prefix could be used to identify and search an index of element values, and an identified non-wild-carded suffix might be reversed and used to identify and search an index of reversed character order renditions of elements. It might be further determined that searching an index is faster or more efficient than sequentially searching against each element, thus resulting in the analysis specifying that searches against the identified indexes are to be performed. Additionally, in situations where there is more than one search mechanism determined, the information service can also determine a particular order of performing the search mechanisms at 323 (i.e., a pipeline search). The selection and ordering of search mechanisms is based on the analysis determining which search mechanism not previously selected for use in the search pipeline would be fastest or most efficient in trimming identified potential matches such that the overall processing of the search pipeline is optimized. Typically, a search mechanism based on a binary search mechanism or hash algorithm is more efficient than a search mechanism that requires sequential matching against each element, such as bit map masking searches and regular expression matching. It could therefore be expected that an analysis that determines that index searches can be used would then determine that index searches be the first search mechanism in a search pipeline. For example, the analysis might determine that a pipeline of search mechanisms should start with searching indexes due to this being the fastest or most efficient method of initially trimming potential matches, then bit map masking should be performed against the identified potential matches as the next fastest or most efficient method of trimming potential matches, and then regular expression matching against the remaining potential matches to generate the final set of elements that match the regular expression.

In implementations, the search mechanisms determined at 319 can include a binary search, an index search, and a bit mask search. For example, the information service may use the binary search or index search when a non-wild-carded prefix or suffix is part of the regular expression as in '^ver.*[0-9]$' or '.*sports$'. Also, the regular expression '^ver.*[0-9]$,' includes a non-wild-carded prefix of "ver," which is identified during parsing of the regular expression. The element "ver" can be matched against an index or used in a binary search to identify all searchable elements that begin with the letters "ver." Further, if the input regular expression were '.*sports$', the non-wild-carded suffix of 'sports' is identified in parse of regular expression. The information service may use this non-wild-carded suffix to perform an index search. This suffix search may be performed by reversing the characters of the suffix "sports" to create the search term "strops." The search term "strops" is then matched against an index or used in a binary search of reversed characters in elements. This identifies all elements that end with the suffix "sports."

Moreover, the information service can use bit masking to identify elements with must-have characters when there are any non-wild-carded characters in the regular expression that must be in a matching element. In some implementations, a bit map mask of the must-have characters is created. During searching, this bit map is used in a bit-wise "and" operation against a bit-mask of characters that are in each searchable data element. If the result of the "and" operation is not equal to the mask, then that element cannot be a match and is eliminated from further search processing. For example, assume an alphabet only consists of letters A, B, C, and D. Bits in a mask and for searchable elements correspond to the letters in the alphabet, with the leftmost bit corresponding to "A," the next bit corresponding to "B," and so forth through the last letter in the alphabet. The corpus of elements to be searched and the bitmaps of characters in those elements can be the following: "CAB"→1110, "DBA"→1101 and "ABBA"→1100. A regular expression 'BA.*D' is received and parsed. It is determined that any matching element must contain the letters 'A', 'B', and 'D'. A bit map for the must-have letters is created to use as a search mask: 1101. The search mask 1101 is used in a "and" operation against the bit masks for each element. Matches are determined based on the result of the "and" operation being equal to the value of the search mask: 1101 and 1110=1100 (no match); 1101 and 1101=1101 (match); 1101 and 1100=1100 (no match).

While particular examples of search mechanisms are described above, it is understood that other search mechanisms can be used in implementations consistent with the present disclosure. For example, some implementations can use least trigraph searching and/or enhanced bit-map matching.

At 327 the information service (executing, e.g., the search module 155) performs the search mechanisms determined at 315. In some implementations, the database (e.g., the data set 35) is searched using the search mechanisms determined at 319 and performs such mechanisms in the order determined at 323. In accordance with aspects of the present disclosure, the search mechanisms are performed in an ordered, pipelined manner in which a result of each mechanism is fed to the next mechanism in the series. For example, at 331 the information service can perform a binary search, at 335 the information service can perform a bit map search, and at 339 the information service can perform the regular expression search. In some implementations, the regular expression matching is the last search mechanism used to search the database at 327. At 343 information service retrieves information from the database identified by the search of 327. At 347 the information service returns a search result (e.g., the search result 30) to the user (e.g., via the communication channel 20 and the client device 10).

FIG. 4 shows a flow diagram illustrating an example of a process 400 for generating data structures (e.g., the optimized data structures 175) for optimized searching in accordance with aspects of the present disclosure. In some implementations, selected elements of records in a database (e.g., domain name information in the data set 35) are processed to create the data structures. The data structures can include, but are not limited to, binary indexes, bit maps that indicate the letters found in the elements, hash tables for elements, and sub-strings of elements.

The process 400 includes, at 403, the information system (e.g., executing text module 157) analyzes records stored in a database (e.g., the data set 35) to identify text elements contained therein that can be used to generate the data structures. In some implementations, the records can be structured text documents (JSON, XML, SGML, HTML, RTF, etc.) stored by an RDAP service. In other implementation, the records can be database records that include discrete data elements that can be assembled into a structured text document. In some implementations, the text elements subject to optimized search processing can be short strings of text that serve as identifiers (e.g., DNS prefixes or suffixes) or are meta-data that has a known structure (numbers, dates, etc.) or include data constrained to a limited set of values (classification codes, characteristics, etc.). At 407 the information service (executing, e.g., the data structure module 159) generates optimized data structures (e.g., the optimized data structures 175) from the elements identified at 403. The optimized data structures can be stored at 411 (e.g., in the storage system 135) for reference during search operations (e.g., the process 300).

In some situations in which a database of discrete data elements is used, rather than a data set of structured text documents, there can be substantial repetitive overhead in generating a structured text representation from the discrete elements when composing search results that include a structured text representation. For example, an RDAP database that has individual data elements for each element of domain data is not an efficient data source for generating RDAP representations of the data contained in the database. Implementations consistent with the present disclosure can avoid such inefficiencies by pre-generating sets of structured text documents that could be returned as search results. For example, an RDAP service (e.g., the information service 15) executing the process 400 can determine database elements to use in generating all the RDAP JSON objects for all the domains in a RDAP database (e.g., the data set 35). These RDAP JSON objects may be stored in the database (e.g., as the optimized data structures 175). When returning search results that include structured text documents, the RDAP service could identify the pre-generated RDAP JSON objects as the source for a returned query response. Doing so avoids, e.g., the processing involved in dynamically generating the RDAP JSON objects by assembling them from individual data elements retrieved from the database. Additionally, in some implementations, the RDAP service may generate different versions of JSON objects for a domain based on differing selections of RDAP data elements. For example, a search result might then include JSON objects that contain the RDAP data elements that the query originator is allowed to access.

FIG. 5 shows a functional flow diagram illustrating an example of a process in accordance with aspects of the present disclosure. At 503 the text module 157 analyzes the contents of data set 35 to identify elements contained in structured text documents 505 (e.g., JSON documents) to generate optimized data structures 175 as previously described herein. For example, the data set 35 can store the documents 505, which have the following structure: {"Gadget":{"Type":"sometype", "Subtype":"sometype", "Color": "somecolor", "Description: "A narrative that describes the gadget"}}. The sub-elements of "Gadget," the "Type," "SubType," and "Color" elements, each have a limited set of possible single-word values, and the "Description" sub-element is an arbitrary string of text. The text module 157 analyzes the documents 505 and identifies the "Type" element, and the "Color" element which are amenable to optimized regular expression search mechanisms, including binary search and bit mask filtering. Based on the elements identified at 503, the data structure module 159 generates binary indices 509 by processing the documents 505 in the data set 35 at 507. The binary indices 509 can include, for example, the "Type" elements and "Color" elements identified at 503. The data structure module 159 can also generate bit map masks for each "Type" element and each "Color" element and store the bit map masks within the set of optimized data structures 175.

At 511 an RDAP service (e.g., the information service 15) receives a RDAP regular expression search query 20 from, for example, a user (e.g., the user 5) via a client (e.g., the client 10). The RDAP regular expression search query can be, for example, "ns[1-9]\.e[a-z]ample\.com." At 515 the parser module 151 parses the regular expression received at 511 and determines that it includes the following text elements: a prefix of "ns," a suffix of "ample.com," and must-have characters a, c, e, l, m, n, o, p, and s. At 519, based on an analysis of the information determined at 515, the analysis module 153 determines a pipeline of search mechanisms for the RDAP regular expression search query 20 received at 511 as previously described herein. In some implementations, the analysis module 153 determines the search mechanisms based on predefined search mechanism rules 521 that map types of data (e.g., prefixes and suffixes) and/or particular data content (e.g., predefined characters and words) to individual rules within a set of rules. For example, based on a first search mechanism rule, the analysis module 153 may determine to perform a joined index search when the parsed information includes a non-wild-carded search prefix and a non-wild-carded search suffix. The analysis module 153 may also, based on a second search mechanism rule, determine to perform a bitmap search when the parsed information identifies a set of characters that must be in any matching element. Further, based on a third search mechanism rule, the analysis module 153 may determine to perform regular expression search matching when the parsed information includes search constructs that cannot be matched using other identified search mechanisms.

In addition, the search mechanism rules 521 may also include predefined rules defining the order for the search mechanisms. For example, a pipeline rule may specify a joined index search always occurs first in a pipeline, and/or that a regular expression search always occurs last.

For example, in accordance with the present illustrated example, based on the search mechanism rules 521, the analysis module can determine a pipelined search based on the parsed search query 20 should include the following search mechanisms: (1) a joined index search using "ns" to search element prefixes and "moc.elpma" to search reversed character order element suffixes; (2) a bitmap indicating the must-have characters as a mask to be matched against bitmaps of characters found in searchable elements; and (3) a regular expression matching using the received regular expression.

At 525 the search module 155 RDAP Service performs the indexed search step and feeds results to the next search mechanism. The search module 155 performs bit map filtering of the results from the previous step and feeds the results to the next search mechanism. The search module 155 matches the received regular expression against each element in the results from the previous step. The results of this are the search pipeline matches. At 527, the search module 155 uses the elements from the search pipeline matches to retrieve the RDAP data from the data set 35 associated with each matching element and composes the search result 30, which can be returned to the user.

In addition to the optimization techniques describe above, it is understood that other techniques can be used in implementations consistent with those described herein. These include, for example:

a. using a synchronization service that does lazy updating of the pre-built RDAP JSON responses to match changes in the underlying data, wherein a RDAP JSON response for updated data is only constructed if the response is needed for a query response and the underlying data has been changed, and an in-memory map of dirty data is used to indicate RDAP JSON responses that would need to be rebuilt if requested;

b. using a synchronization as in (a) above with the addition that pre-built RDAP JSON responses are updated as a lower priority task even before they are requested, and performed as a low priority task so that the rebuilding does not interfere with search processing;

c. performing in-memory search processing by having the element lists in memory;

d. retaining pre-built JSON responses in-memory;

e. multi-threading search processing; and f. limiting the amount of computing resources to be consumed (i.e. CPU and memory limits) or percentage allocated during processing (i.e. allow no more that 5% of CPU to be allocated).

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is also to be understood that the terminology used herein is for the purpose of describing examples of implementations, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." In addition, where features or aspects of the disclosure are described in terms of Markush groups, those skilled in the art will recognize that the disclosure is also thereby described in terms of any individual member or subgroup of members of the Markush group.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the claims.

What we claim is:

1. A method comprising:
   receiving, by a computing device, a regular expression search query from a client;
   parsing elements of the regular expression search query;
   identifying, based on the elements parsed from the regular expression search query, i) two or more search mechanisms to use from a plurality of search mechanisms and ii) a pipeline order for performing the two or more search mechanisms, wherein the two or more search mechanisms comprise at least one of a joined index search, a bitmap filter search, or a regular expression search, wherein the ordering of the pipeline order of the two or more search mechanisms is based on speed and/or efficiency of searching a data set identified by the regular expression search query;
   searching the data set identified by the regular expression search query using the two or more identified search mechanisms and based on the pipeline order for performing the two or more search mechanisms; and
   returning a search result from the data set to the client based on a result of the searching.

2. The method of claim 1, wherein parsing the elements of the regular expression search query comprises parsing wildcard elements included in the regular expression search query from required characters included in the regular expression search query.

3. The method of claim 1, wherein a last search mechanism in the pipeline order of performing the two or more search mechanisms is the regular expression search.

4. The method of claim 1, wherein searching the data set comprises searching predefined indices corresponding to the elements of the regular expression search query.

5. The method of claim 1, wherein the data set corresponds to a Domain Name System (DNS) registry.

6. The method of claim 1, wherein the method is performed by a Registration Data Access Protocol (RDAP) service.

7. The method of claim 6, wherein the regular expression search query comprises a Hypertext Transfer Protocol request specifying a domain, the RDAP service, and the regular expression search.

8. The method of claim 1,
   wherein a first search mechanism in the pipeline order is the joined index search, and a second search mechanism in the pipeline order is the bitmap filter search or the regular expression search.

9. The method of claim 1, wherein searching the data set further comprises providing an output of a first search mechanism as input to a second search mechanism.

10. The method of claim 1, wherein the at least two or more search mechanisms further comprise at least one of a trigraph searching or an enhanced bit-map matching.

11. A system comprising a processor, a data storage device, and program instructions stored on the data storage device that, when executed by the processor, control the system to perform operations comprising:
    receiving a regular expression search query from a client;
    parsing elements of the regular expression search query;
    identifying, based on the elements parsed from the regular expression search query, i) two or more search mechanisms to use from a plurality of search mechanisms and ii) a pipeline order for performing the two or more search mechanism, wherein the two or more search mechanisms comprise at least one of a joined index search, a bitmap filter search, or a regular expression search, wherein the ordering of the pipeline order of the two or more search mechanisms is based on speed and/or efficiency of searching a data set identified by the regular expression search query;
    searching the data set identified by the regular expression search query using the two or more search mechanisms and based on the pipeline order for performing the two or more search mechanisms; and
    returning a search result from the data set based on a result of the searching.

12. The system of claim 11, wherein parsing the elements of the regular expression search query comprises parsing wildcard elements included in the regular expression search query from required characters included in the regular expression search query.

13. The system of claim 11, wherein a last search mechanism in the pipeline order of performing the two or more search mechanisms is the regular expression search.

14. The system of claim 11, wherein searching the data set comprises searching predefined indices corresponding to the elements of the regular expression search query.

15. The system of claim 11, wherein the data set corresponds to a Domain Name System (DNS) registry.

16. The system of claim 11, wherein the operations are performed by a Registration Data Access Protocol (RDAP) service.

17. The system of claim 16, wherein the regular expression search query comprises a Hypertext Transfer Protocol request specifying a domain, the RDAP service, and the regular expression search.

18. A non-transitory computer program product comprising programing instructions stored on a computer-readable hardware storage device, wherein the program instructions, when executed by a processor, control a computing system to perform operations comprising:
    generating a data structure corresponding to strings of text included in structured documents stored in a data set;
    identifying, based on the elements parsed from a regular expression search query, i) two or more search mechanisms to use from a plurality of search mechanisms and ii) a pipeline order for performing the two or more search mechanisms, wherein the two or more search mechanisms comprise at least one of a joined index search, a bitmap filter search, or a regular expression search, wherein the ordering of the pipeline order of the two or more search mechanisms is based on speed and/or efficiency of searching the data structure;
    searching the data structure using the two or more search mechanisms and based on the pipeline order for performing the two or more search mechanism; and
    returning a search result from the data set based on a result of the searching.

19. The non-transitory computer program product of claim 18, wherein:
    the data structure comprises one or more of: a binary index, a bitmap of letters included in strings of text, a hash table, or sub-strings of strings of text;
    the data set corresponds to a Domain Name System (DNS) registry;
    the operations are performed by a Registration Data Access Protocol (RDAP) service; and the regular expression search query comprises a Hypertext Transfer Protocol request specifying a domain, the RDAP service, and the regular expression search.

\* \* \* \* \*